United States Patent

Sawai et al.

[11] Patent Number: 5,398,880
[45] Date of Patent: Mar. 21, 1995

[54] DEVICE FOR SELECTING TAPE-REEL CONTROL MODE

[75] Inventors: Kunio Sawai; Kouji Morinaka, both of Daito, Japan

[73] Assignee: Funai Electric Co., Ltd., Daito, Japan

[21] Appl. No.: 984,437
[22] PCT Filed: Feb. 28, 1992
[86] PCT No.: PCT/JP92/00224
 § 371 Date: Feb. 23, 1993
 § 102(e) Date: Feb. 23, 1993
[87] PCT Pub. No.: WO93/01594
 PCT Pub. Date: Jan. 21, 1993

[30] Foreign Application Priority Data

Jul. 1, 1991 [JP] Japan .................. 3-059236 U
Jul. 1, 1991 [JP] Japan .................. 3-059237 U
Jul. 1, 1991 [JP] Japan .................. 3-059238 U
Jul. 1, 1991 [JP] Japan .................. 3-059239 U
Jul. 3, 1991 [JP] Japan .................. 3-059934 U

[51] Int. Cl.⁶ ............................................. G11B 15/18
[52] U.S. Cl. ........................... 242/343.2; 242/334.1; 242/355.1; 360/96.3
[58] Field of Search .................. 242/204, 156.2, 334.1, 242/343.2, 356.4, 355.1, 355; 360/74.1, 96.3

[56] References Cited

U.S. PATENT DOCUMENTS

| 4,336,560 | 6/1982 | Matsumoto | 360/137 |
| 4,747,564 | 5/1988 | Tsubota | 242/204 |
| 4,807,061 | 2/1989 | Yoon | 360/74.1 |
| 4,899,951 | 2/1990 | Okada et al. | 242/204 |

FOREIGN PATENT DOCUMENTS

| 20105501 | 4/1984 | European Pat. Off. . |
| 20335377 | 10/1989 | European Pat. Off. . |
| 2239980 | 7/1991 | United Kingdom . |

Primary Examiner—Daniel P. Stodola
Assistant Examiner—John Q. Nguyen
Attorney, Agent, or Firm—Lackenbach Siegel Marzullo Aronson & Greenspan

[57] ABSTRACT

A device for selecting a tape-reel control mode adapted for use in a video tape recorder and/or player is provided with a devise for locking the shift member in a fast-running mode position, and a device for relieving the shift member from the locking condition in such a manner that a mode selecting cam is regulated by a cam drive motor in the same direction as that in the previous mode, just after the control mode is changed from the previous mode to the next mode.

3 Claims, 12 Drawing Sheets

FIG. 12

DEVICE FOR SELECTING TAPE-REEL CONTROL MODE

THE BACKGROUND OF THE INVENTION

The present invention relates to a device for selecting tape-reel control mode adapted to a tape recording and/or playing device such as a video tape recorder, a video tape player, DAT and camera recorder for home or business use as well as combination recorder with a television, and the other visual or audio device having a tape recorder and/or player.

The prior recorder and/or player with tape-winding system had generally included a tape deck having a pair of tape-reel setting discs to which a pair of tape-reels journalled in a tape-cassette are removably engaged as the tape-cassette is set on the deck, a torque transmission means through which either one of the setting discs is alternately rotated in a forward or backward direction by means of a drive motor, and means for selecting a prescribed tape-reel control mode from various control modes such as a recording mode, a playing mode, fast-running mode, rewinding mode, etc., thereby to drive the setting disc under a speed depending on the selected control mode mentioned above.

In order to maintain a tape in a manner to be partially stretched between the tape-reels, the tape-winding system mentioned above includes means for braking the setting disc just when the setting disc runs in a reverse direction under the regulation depending on the prescribed control mode, together with means for preventing slack in the stretched portion of the tape.

However, the prior recorder and/or player should be provided with a separate motor or an electromagnetic solenoid device together with means for biasing braking members disposed at suitable positions associated with the setting disc and torque transmission mean. It is undesirable to cause in increase in the number of parts or, weight and cost of the device, as well as further complicating its construction.

OBJECTS OF THE INVENTION

An object of this invention is to provide a device for selecting a tape-reel control mode adapted for use in a tape recorder and/or player wherein means for biasing the braking members can be regulated by means of a drive motor, which is adapted to regulate a mode selecting cam member and a shift member, the shift member being adapted to set a torque transmission device and means for controlling the braking members and other associated members according to the prescribed control mode, without an additional motor or solenoid device.

A second object of this invention is to provide a device for selecting a tape-reel control mode adapted for use in a tape recorder and/or player wherein there are provided means for locking the shift member in a fast-running mode position, and means for relieving the shift member from the locking condition in such a manner that the mode selecting cam is regulated by the drive motor in the same direction as that in the previous mode, just after the control mode is changed from the previous mode to the next mode.

A third object of this invention is to provide a device for selecting tape-reel control mode adapted for use in a tape recorder and/or player wherein there are provided means for locking the shift member in a fast-running mode position, and means for relieving the shift member from the locking condition at such timing so that the mode selecting cam is yet not being regulated by the drive motor just when the control mode is exchanged from the previous mode, thereby to actuating the braking members ahead of time at which the drive motor starts under the next mode without it being loaded by the mode selecting cam.

SUMMARY OF THE INVENTION

According to the present invention, there is provided a device for selecting a tape-reel control mode adapted to a tape recorder and/or player in which are included a tape deck having a pair of tape-reel setting discs to which a pair of tape-reels journalled in a tape-cassette are removably engaged as the tape-cassette is set on the deck, a torque transmission device for alternately supplying a torque power from a drive motor to either one of the tape-reel setting discs, and means for braking the setting disc under the prescribed control mode together with means for preventing slack in the stretched portion of a tape between the tape-reels, the braking means including braking members respectively to the tape-reel setting disc, characterized by comprising a shift member retractably supported to a chassis and adapted to regulate the respective braking member, means for biasing the shift member at a braking position as the control mode is exchanged from the fast-running mode to the other mode, a mode selecting cam associated to the shift member through a cam follow member, a cam-drive motor, a locking member adapted to lock the cam follow member at the fast-running mode position against the bias of the biasing means, and means for relieving the lock condition of the locking member to the cam follow member in such a manner that the mode selecting cam is regulated by the cam-drive motor in the same direction as that in the previous fast-running mode, just after the control mode is exchanged from the previous mode to the next mode.

Further features and advantages of the present invention will be apparent from the following description taken with reference to the accompanying drawings.

DETAILED DESCRIPTION

A device of this invention is adapted for selecting a tape-reel control mode adapted to a tape recorder and/or player as well as combinations thereof which is illustrated in the drawings and described hereinafter as embodiments.

The tape recording and/or playing device in this embodiment includes a tape deck chassis 1 having a pair of tape-reel setting discs 10 and 11 with rotating shafts 10a and 11a to which a pair of tape-reel (not shown by any reference number) journalled in a tape-cassette 9 are removably engaged as the tape-cassette 9 is set on the deck, and a torque transmission device for alternately supplying a torque power from a drive motor 40 to either one of the tape discs 10 and 11. The drive motor 40 includes a fly wheel and an output shaft with a capstan roller 14.

The device further includes a cassette holder 16 for guiding the tape-cassette 9 along side guide members 17 and 18 to the tape-reel setting discs 10 and 11, a pinch roller 15 adapted to pinch the tape to the capstan roller 14, a head cylinder 2 to which are disposed an input and output head 12 applied to audio-signal singal and an erasing head 13, a pair of slide members 7 and 8 with tape-loading pins 3 and 4 adapted to guide the tape to the periphery of the head cylinder 2 when the cassette 9 is loaded on the tape-reel setting discs, a pair of guide rails 5 and 6 disposed to the chassis 1, and means for carrying the slide members 7 and 8 along the guide rails.

Figure 1:
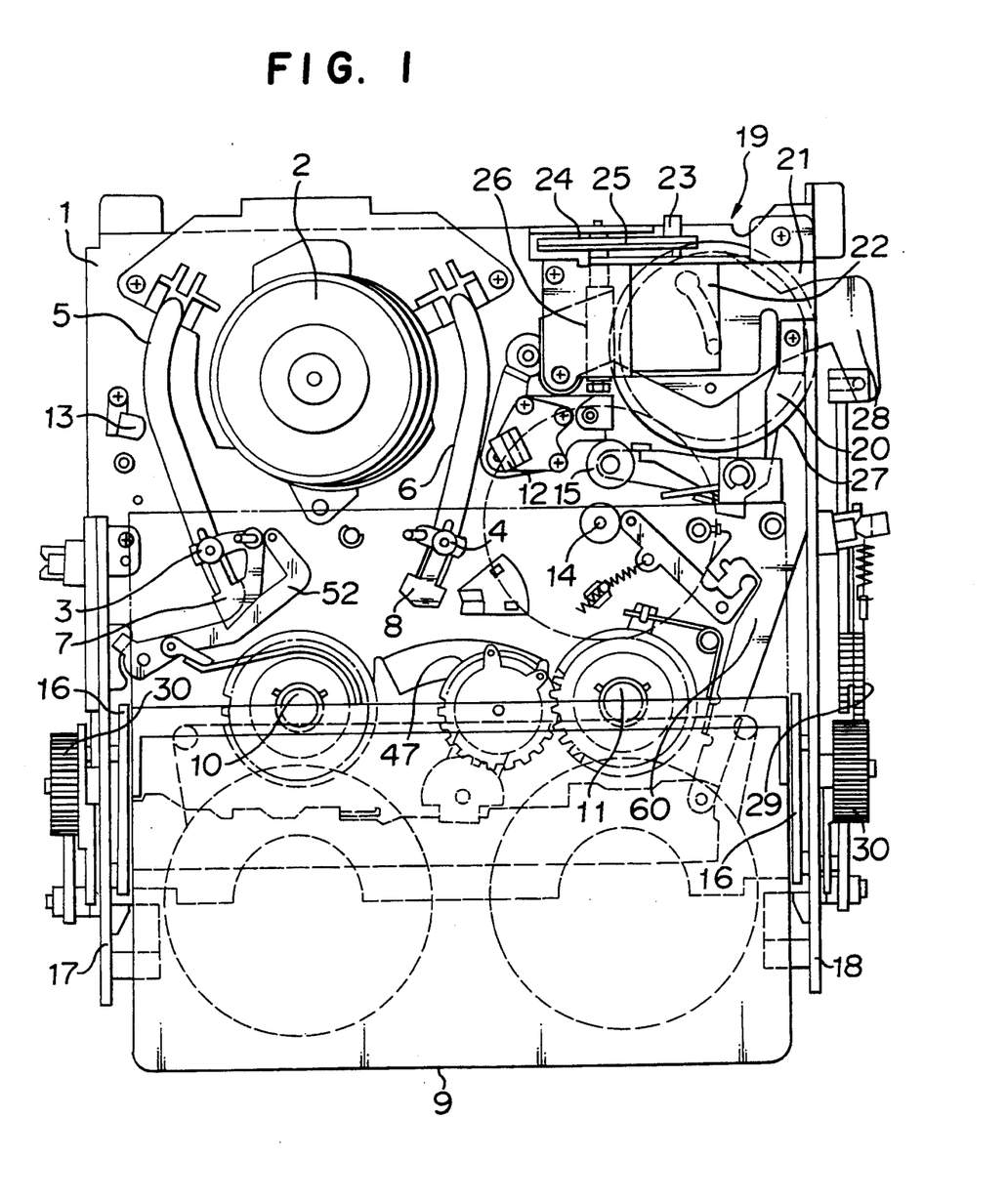
FIG. 1 is a plan view of a tape recording and playing device including means for selecting a tape-reel control mode according to an embodiment of this invention wherein a tape cassette is yet not set on a tape deck disposed in a chassis.
Figure 2:
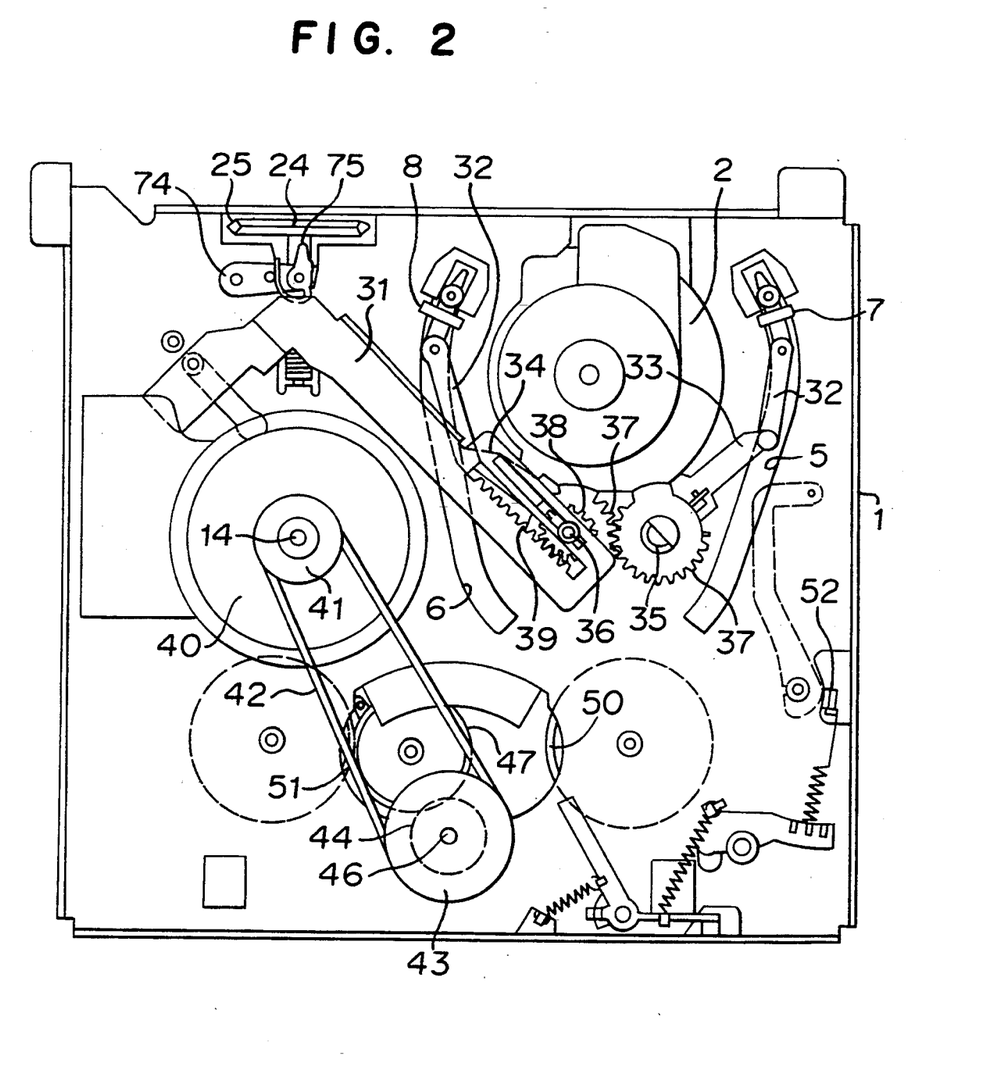
FIG. 2 is a bottom view of the embodiment mentioned above wherein the tape cassette is set on the tape deck.

The carrying means includes two link members 32 pivoted to the slide members 7 and 8 respectively, two loading arms 33 pivoted to the link members 32 respectively and rotatably supported to the back side of the chassis 1 by means of pivots 35 and 36, two gears 37 fixed to the loading arms 33 respectively and intermeshed to each other, a pinion 38 coaxially secured to the left side one of the gears 37, and a loading lever 31 retractably supported to the back side of the chassis 1 and having rack teeth 39 intermeshed to the pinion 38 so that the loading lever 31 is carried when the tape-cassette 9 is loaded to the tape-reel discs, as shown in FIG. 2 in detail.

In order to carry the cassette holder 16 with the tape-cassette 9 from an input and output portion of the chassis 1 to the tape-reel setting discs or in reverse it vice versa, there are provided with a carrying lever 28, a rack gear member 29 shifted by the motion of the carrying lever 28, and gears 30 rotatably supported to the both sides of the cassette holder 16 so as to be driven by the rack gear member 29 with its intermeshing thereto.

In this embodiment, the torque transmission device comprises two gears 50 and 51 coaxially attached to the tape-reel setting discs 10 and 11, a selecting gear 47 alternately intermeshed to the gears 50 and 51 and journalled to a shift member 45, the shift member 45 being swingingly supported to a shaft 46 mounted on the chassis 1 so as to engage with the selecting gear 47 with either one of the gears 50 and 51, a gear 44 with a clutch member (not shown) generally intermeshing to the selecting gear 47, a drive pulley 41 connected to the output shaft 14, a driven pulley 43 coaxially supported to the shaft 46 with its clutch member (not shown) being frictionally engaged to the clutch member mentioned above, and an endless belt 42 stretchedly wound to both pulleys 41 and 43.

The shift member 45 can be turned to cause the selecting gear 47 to be intermeshed to either one of the gears 50 and 51 due to the rotating torque applied to the shift member 45 through the transmission route when the drive motor 40 is started to its reverse direction by changing the tape-reel control mode. In this case, the swinging motion of the shift member 45 may be limited in a prescribed scope by means of stoppers 49.

The tape recorder further includes means for braking the tape-reel setting discs 10 and 11 under the prescribed control mode together with means for preventing slack in the stretched portion of a tape between the tape-reels. The braking means includes braking members 53, 55 and 54, 56 respectively adapted to the tape-reel setting discs 10 and 11, all of the braking members being pivotally supported to the chassis 1 by means of pivot posts 53a, 55a and being 54a, 56a, and biased to the tape-reel setting discs 10 and 11 by means of tension spring members 73. The braking members 53, 54 and 56 are provided with cam follow pins (not shown by reference numbers), and the braking member 55 is provided with a guide fork to which a shift pin is engaged. The shift pin is attached to a lever 55b which is provided with a cam follow pin and rotatably supported to the chassis 1 by means of a pivot post 55c.

The means for preventing slack in the tape relief mainly includes a tape tension lever 52 pivotally supported to the chassis 1, a back-tension post 52a attached to the free end of the lever 52, a brake releasing lever 52b, and a band brake member 52c disposed around the tape-reel setting disc 10 in a manner to be touched to the periphery of the setting disc 10 under the braking operation, the band brake member 52c having its ends connected to the levers 52a and 52b.

The device for selecting a tape-reel control mode is particularly provided with a shift member 57 retractably supported to a chassis 1 with means of guide slits 59 formed to the shift member 57 and guide posts 58 standing on the chassis 1, the shift member 57 being adapted to regulate the respective braking member by means of cam surfaces formed to the edge thereof in such manner that the cam follow pins are followed to the pattern of the cam, means for biasing the shift member at a braking position as the control mode is changed from the fast-running mode to the other mode, the biasing means consisting of a torsional spring member 72 in this embodiment, a mode selecting cam 20 associated to the shift member 57 through a cam follow member 60, a cam-drive motor 22, a locking member 62 adapted to lock the cam follow member 60 at the fast-running mode position against the bias of the torsional spring member 72, and means for relieving the lock condition of the locking member 62 to the cam follow member 60 in such manner that the mode selecting cam 20 is regulated by the cam-drive motor 22 in the same direction as that in the previous fast-running mode, just after the control mode is exchanged from the previous mode to the next mode.

In this embodiment, the cam disc 20 is rotatably supported to the chassis 1 with its cam shaft 68, and the cam follow member 60 has a follow pin guided along a cam groove 63 formed to the cam disc 20, a pivot 61 journaled to the chassis 1 at the middle portion thereof, and its one end is pivotally engaged to the shift member 57 and its other end is disengagably locked to the locking member 62 by means of an engaging notch 65 formed to the locking member 62. The torsional spring member 72 is biased in a clockwise direction in this embodiment and directly applied to the cam follow member 60 through which the spring bias is supplied to the shift member 57. The locking member 62 is rotatably supported to the chassis 1 with its journal post 69 standing through the chassis 1 and has a gear 67 intermeshed to a gear 27 integrally formed to the periphery of the cam disc 20, and means of a compression spring member 66 adapted to bias the gear 67 against the rotation applied to the gear 67. And the cam disc 20 further includes cam grooves for guiding a swinging lever adapted to the pinch roller 15 and the carrying lever 28 already mentioned.

In order to transmit torque power from the cam-drive motor 22 to the cam disc 20, the device includes a reversible worm 26 intermeshed to the gear 27 and having a shaft 79 which is journalled to bearings disposed to the chassis 1 and coaxially connected to a driven pulley 24 rotatably supported to the shaft 79 via means for delaying the transmission of the rotation when the cam-drive motor is start in a reverse direction, the driven pulley 24 having a journal 78 integrally formed to one side thereof. Furthermore, the driven pulley 24 is rotated through a drive pulley 23 connected to the output shaft of the cam-drive motor 22 and an endless belt 25 stretched between the pulleys 23 and 24 in the wound condition.

In this embodiment, the delaying means involves a hole 82 formed to the end portion of the worm 26 with its inner periphery having a stop protrusion 84, and a pushing protrusion 83 formed to the end portion of the journal 78 so that the pushing protrusion 83 is rotatably inserted into the hole 82 and adapted to be engaged to the stop protrusion 84 thereby to transmit the torque power from the pulley 24 to the worm 26 but not release the transmission between such an interval that the protrusion 83 is carried away from the one side of the protrusion 84 and touched to the other side thereof in the hole 82 when the cam-drive motor is start to its reverse direction.

Figure 4:
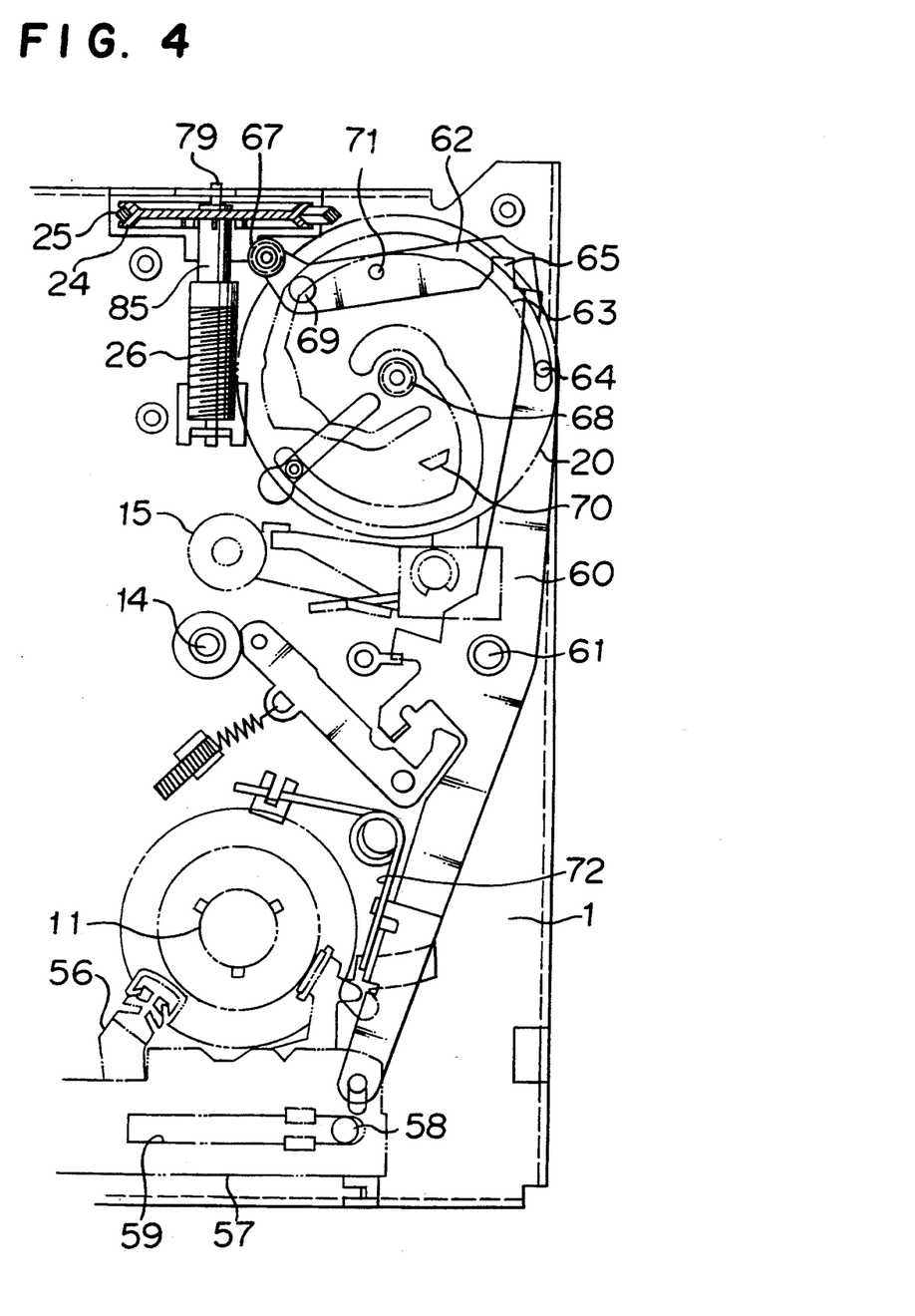
FIG. 4 is an enlarged plan view of the essential part of the embodiment mentioned above wherein the tape cassette is set on the tape deck under a braking condition far to the fast-running mode.
Figure 5:
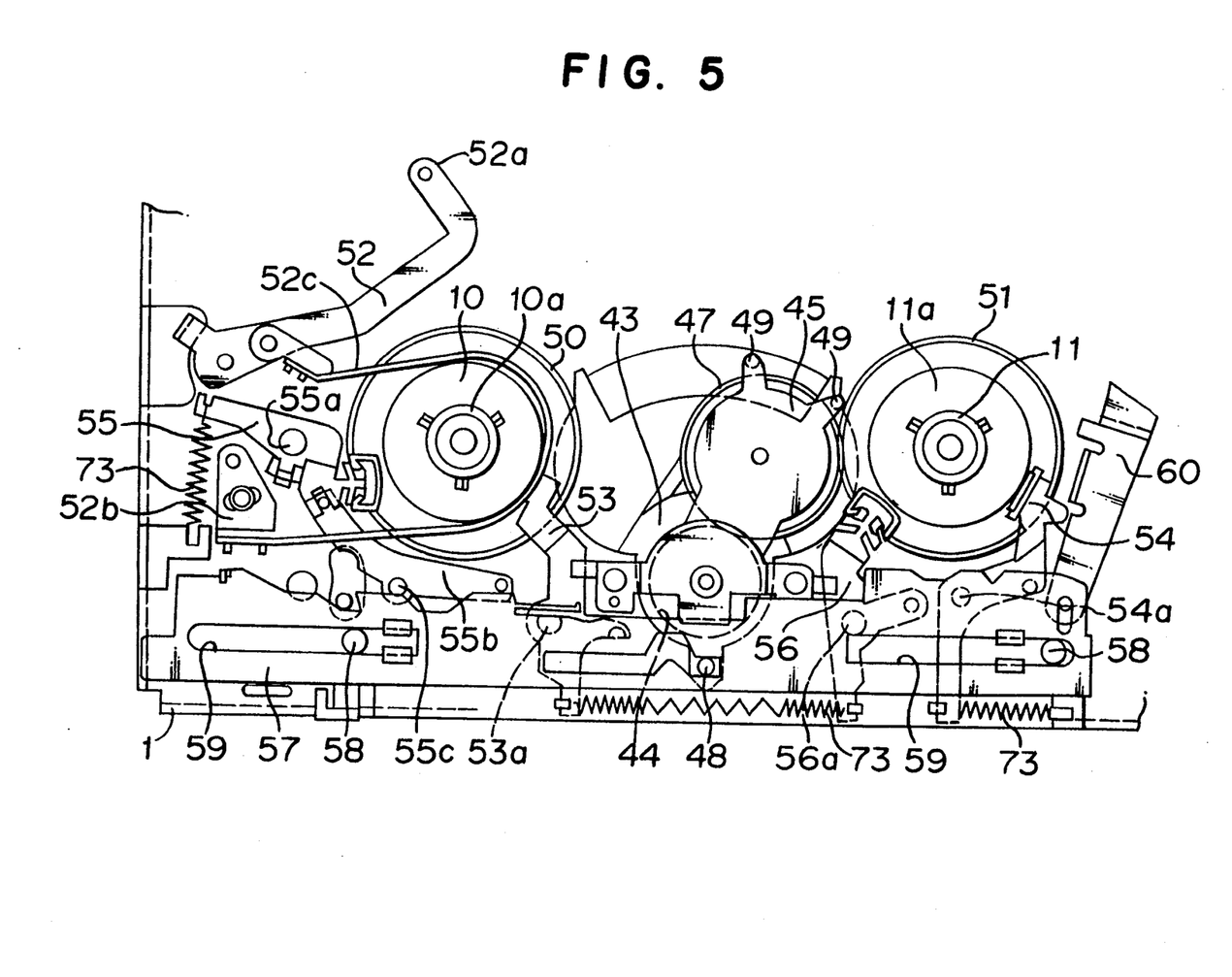
FIG. 5 is an enlarged plan view of the essential part of the embodiment mentioned above wherein means for controlling a shift member included in this invention.

The device of this invention further includes means for relieving the shift member 57 from the locking condition (as shown in FIG. 4) in such manner that the mode selecting cam 20 is regulated by the drive motor 22 in the same direction as that in the previous mode, i.e., the fast-running mode, just after the control mode is exchanged from the previous mode to the next mode.

Figure 3:
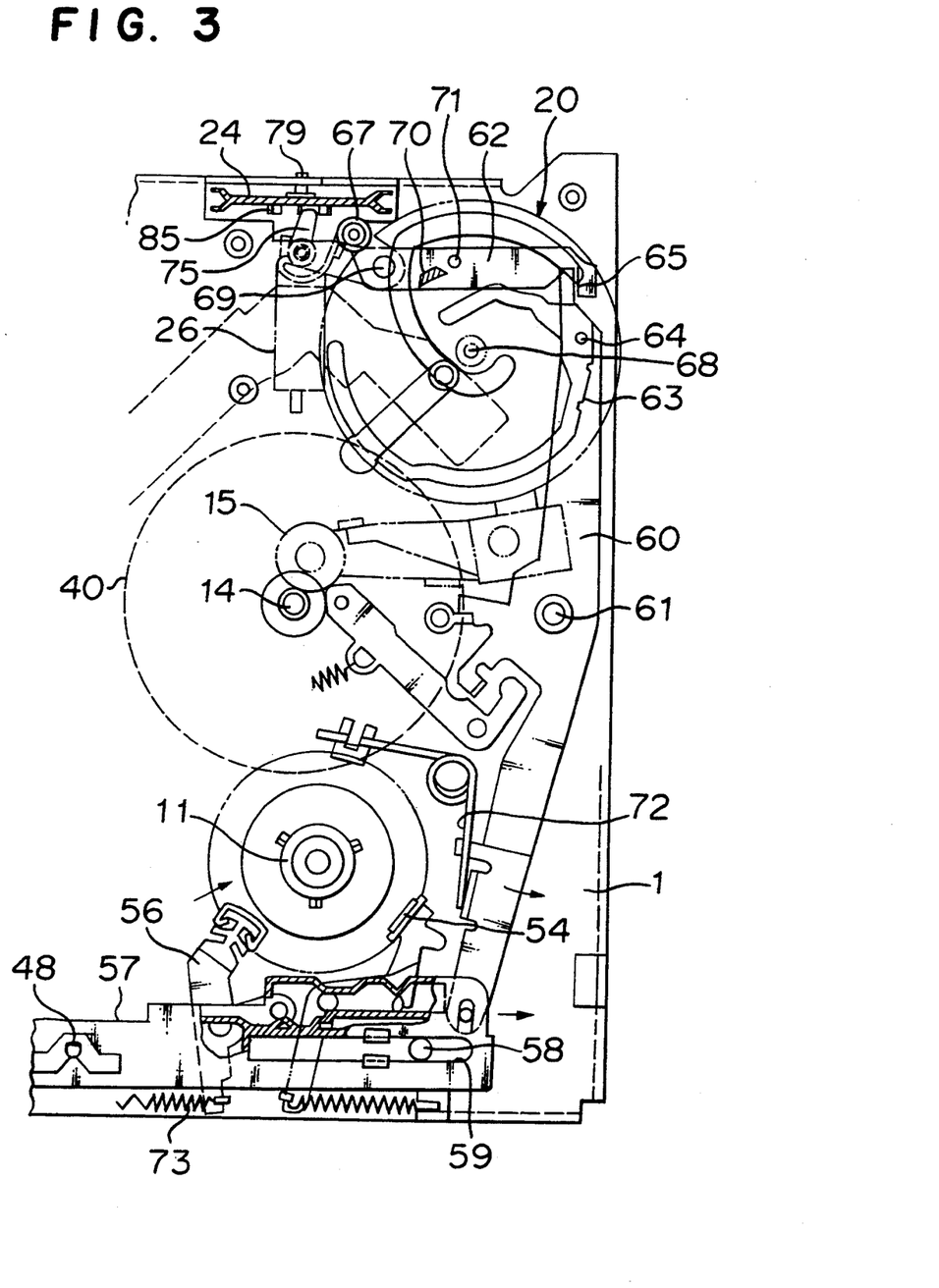
FIG. 3 is an enlarged plan view of the essential part of the embodiment mentioned above wherein the tape cassette is set on the tape deck under a fast-running mode.

In this embodiment as shown in FIG. 3, the relieving means includes an abutting member 71 disposed to the locking member 62 and a guide piece 70 mounted on the cam disc 20 so that the locking member 62 is turned with its abutting member 71 being deflected to the guide piece 70 in a manner to cause the notch 65 to be disengaged from the free end of the cam follow member 60 when the cam disc 20 is further turned from a position illustrated in FIG.3 in an counter-clockwise direction in which the tape-reel setting disc 10 and 11 is driven under a fast-running mode.

The relieving means further includes means for fast-relieving the cam follow member 60 from the locking condition at such timing as that the mode selecting cam 20 is yet not being regulated by the drive motor 22 due to the short-timing operation of the delaying means mentioned above just when the control mode is exchanged from the previous mode, i.e., the fast-running mode.

Figure 9:
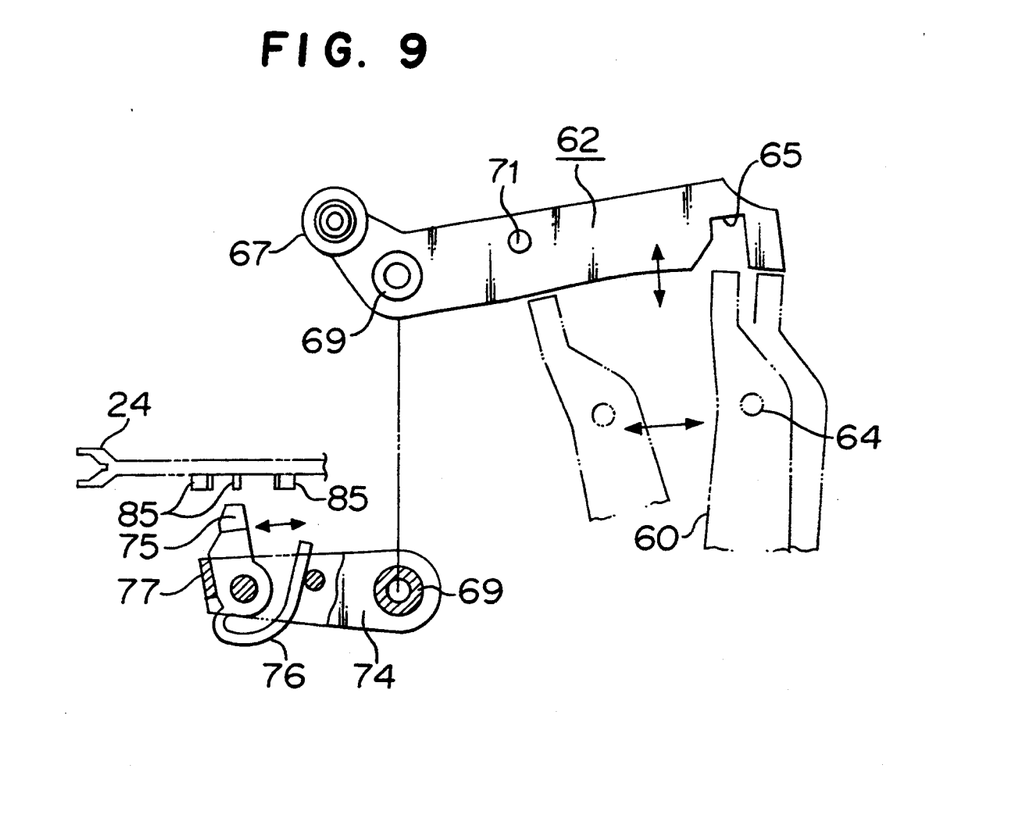
FIG. 9 is a plan view of the part of the embodiment wherein a locking member and the other members associated thereto are disassembled for simple illustration.
Figure 10:
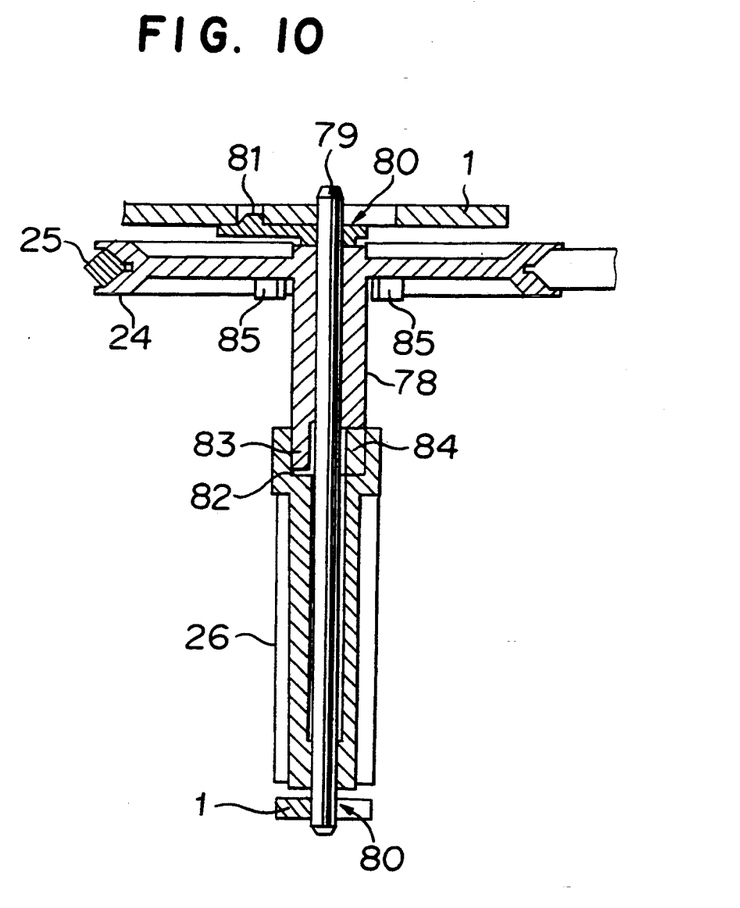
FIG. 10 is a vertical cross-section of the part of the embodiment wherein means for transmitting rotation from a cam-drive motor to the mode selecting cam is illustrated.
Figure 11:
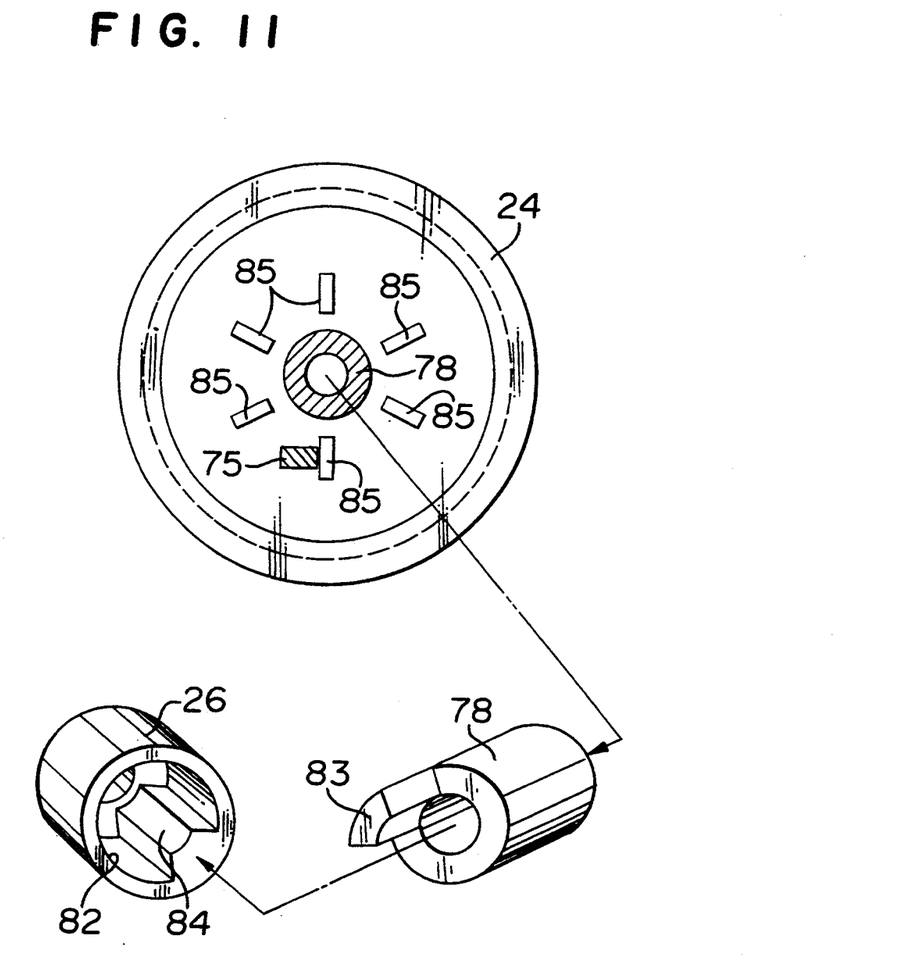
FIG. 11 is a bottom view and a perspective view of the part of the embodiment wherein a driven pulley and means for delaying the rotation from the pulley to the mode selecting cam involved in the transmitting means.

In this embodiment as shown in FIG. 9 and 11, the fast-relieving means consists of a kick lever 74 fixedly connected to the locking member 62 via the journal post 69, a kick arm 75 pivoted to the kick lever 74 and having a loop spring portion 76 integrally formed thereto so as to bias the kick arm 75 toward a stopper portion 77 formed to the kick lever 74, and a plurality of abutting ribs 85 mounted on one side face of the driven pulley 24 and arranged along a circle coaxially defined to the pulley axis and spaced equidistantly from each other, the kick arm 75 being capable to be inserted against the bias of the loop spring portion 76 into a possessed area in which the abutting ribs 85 is driven by the rotation of the pulley 24. Accordingly, the kick arm 75 is pushed out from the possessed area when the cam-drive motor 22 drives under the either one of the fast-running mode, recording mode or playing mode, and carried together with the pulley 24 with the kick arm 75 being pushed by one of the abutting ribs 85 under its position, at which the stopper portion 77 supports the kick arm against the bias of the spring portion 76, ahead of time at which the cam-drive motor 22 starts to the reverse direction under the next control mode (the rewinding mode) and during the delaying means is actuated as mentioned above so as to turn the locking member 62.

As the results, the lock condition between the notch 65 and the free end of the cam follow member 60 is relieved, thereby to shift the shift member 57 by the bias of the torsional spring member 72 so as to actuate the braking members ahead of time at which the drive motor 22 starts under the next mode without it being loaded by the mode selecting cam 20.

Figure 6:
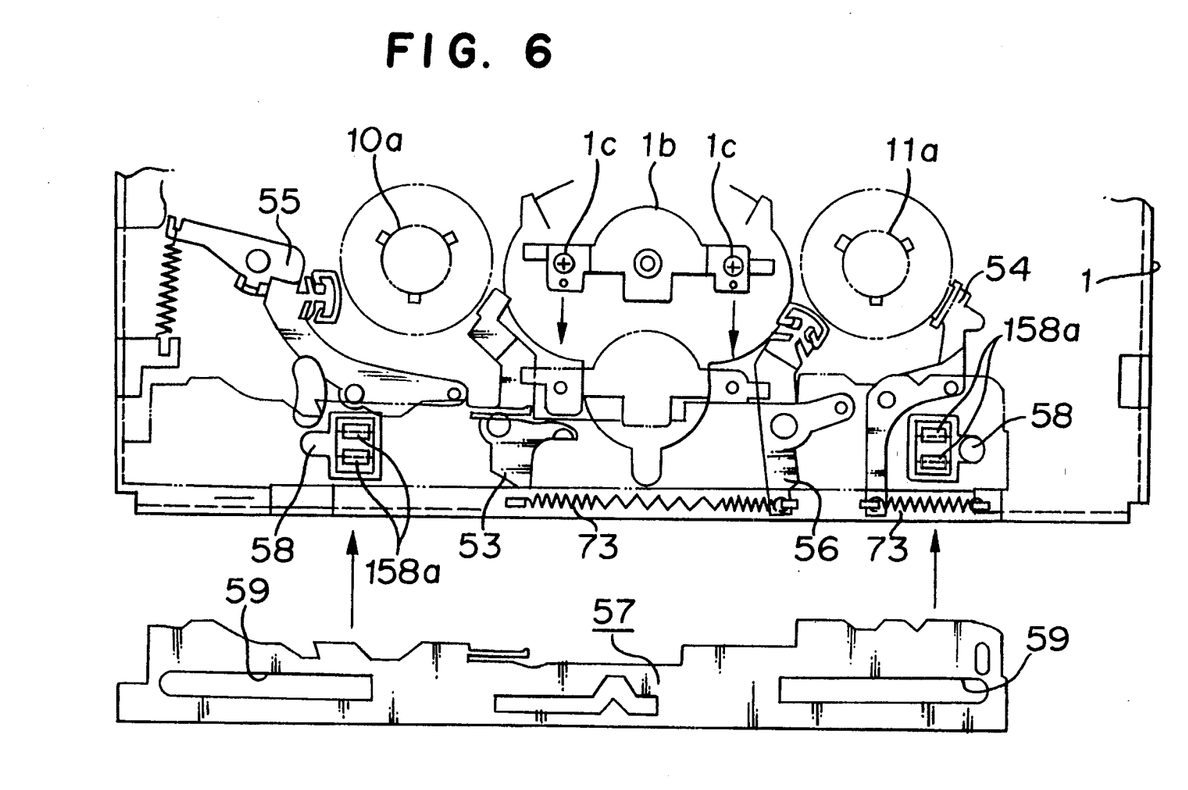
FIG. 6 is an enlarged plan view of the essential part illustrated in FIG. 5 wherein some parts are demounted.
Figure 7:
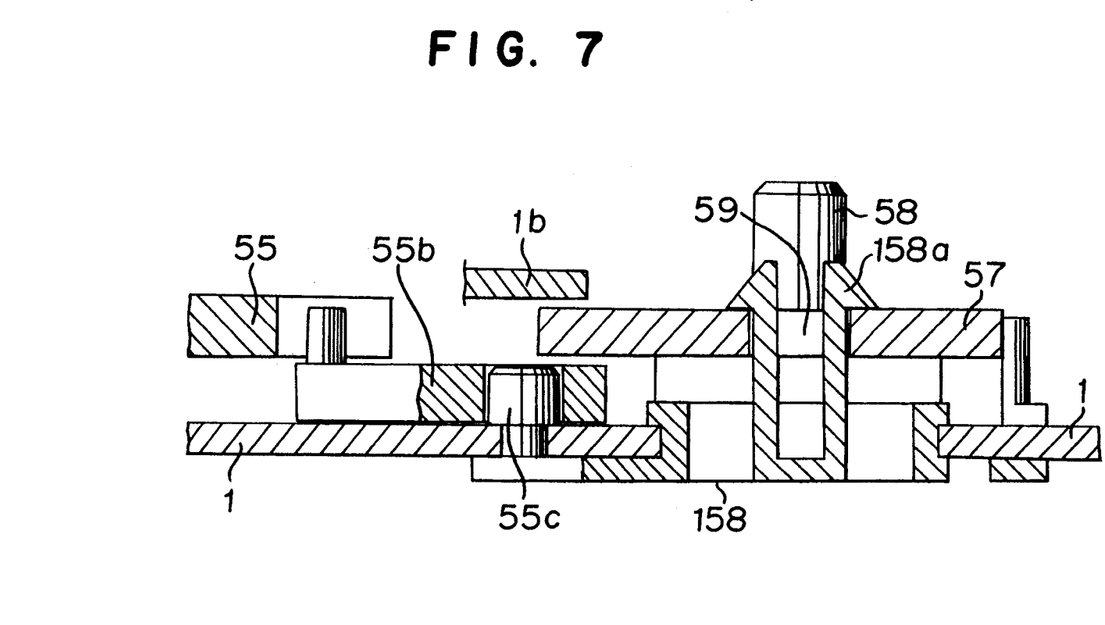
FIG. 7 is an enlarged vertical view of the part illustrated in FIG. 5.
Figure 8:
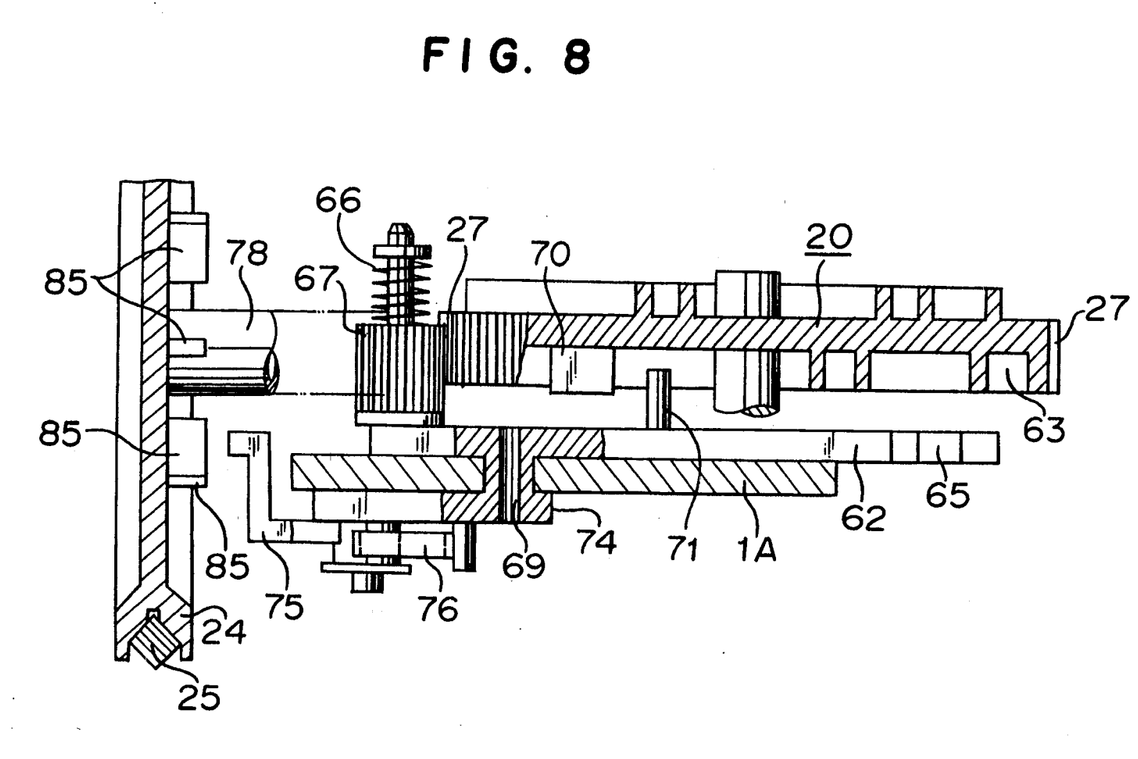
FIG. 8 is a vertical cross-section of the part of the embodiment wherein a mode selecting cam and the other members associated thereto are illustrated.

In this embodiment, the locking member 62 is preferably formed to the kick lever 74 in an integral shape by means of moulding process on both sides of the chassis plate 1A. The shift member 7, brake members 53, 54 and 56, and lever 55b may be assembled to the upper side of the chassis 1 as shown in FIG. 6 and 7. In this case, the guide posts, for example, the guide post 55c (as shown in FIG. 7) is integrally formed to a plastic moulding piece 158 which is mounted on the chassis 1 by means of moulding process mentioned above and which has hooks 158a extending upwards through the guide groove 59. Accordingly, the shift member 57 can be slidably supported on the upper surface of the chassis 1 with the hooks 158a depressing the upper surface of the shift member 57 without any other supporting member, and the brake members and lever can be also supported under the turnable condition between the shift member 57 and the chassis 1, in such manner that the lever 55b is, for example, supported on the upper surface of the chassis 1 as shown in FIG. 7 with its pivot portion being sandwiched between the shift member 57 and the chassis 1 without any other supporting member. The assembly including the shift member, brake member, lever and guide posts mentioned above is very simple and reliable as compared to the prior assembly including the same members.

Furthermore, the braking members 53 and 56 may be supported on the chassis 1 at their other portions by means of a cover plate 1b which is attached to the chassis 1 by means of set screws 1c in a manner to overhang the braking members 53 and 56 partially.

Figure 12:
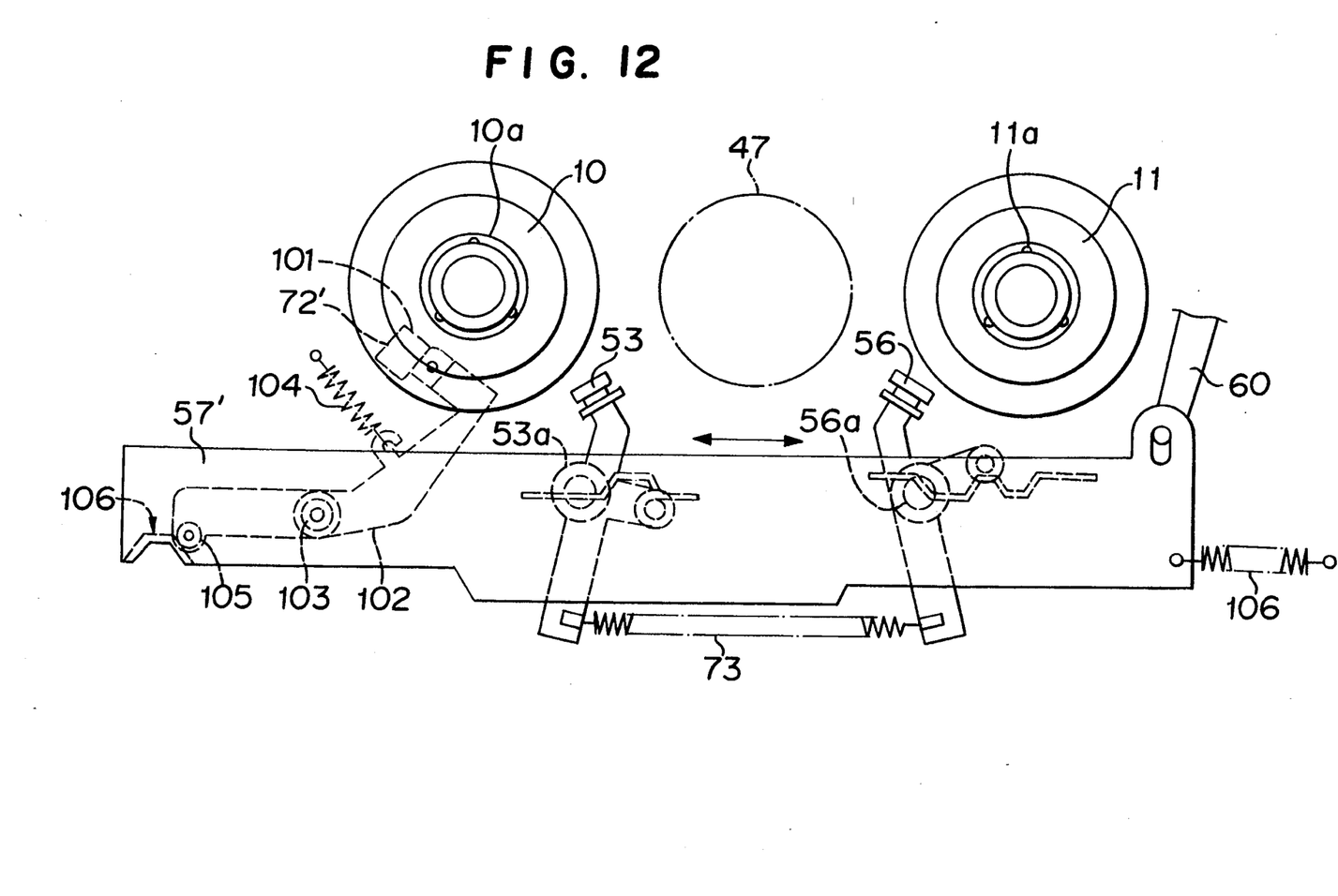
FIG. 12 is a plan view of another embodiment of this invention wherein a shift member and the other members associated thereto.

Another embodiment of the present invention as shown in FIG. 12 includes a shift member 57' which is biased by means of an electromagnetic solenoid 72' in stead of the torsional bias spring member adapted to the first embodiment mentioned above. In this embodiment, the solenoid 72' is disposed to the chassis 1 and has an electromagnet member, to which a ferrite piece 101 is set opposite. The ferrite piece 101 is attached to a shift lever 102, which is disposed to the chassis 1 with its being turnable by means of a supporting post 103 and which is biased by means of a tension spring member 104 to a direction to which the ferrite piece 101 is attracted to the electromagnet member when the solenoid 72' is energized. The shift lever 102 further includes a shift roller 105 pivoted to the free end thereof, the shift roller 105 following to an abutting edge 106 formed to the shift member 57' so that the shift member 57' can be carried by the bias of the spring member 104 as well as by the attraction force applied by the solenoid when the cam-follow member 60 under a fast-running mode causes the shift member 57' to be shifted in a leftwardly direction as best shown in FIG. 12.

While, the shift member 57' is generally biased by means of a tension spring member 106 of which the bias is force larger than that of the spring member 104 but is smaller than that of the spring member 104 under the addition of the magnetic force applied by the solenoid 72'. Accordingly, the shift member 57' can be carried by the bias of the spring member 106 to a rightwardly direction in FIG. 12 when the solenoid 72' is de-energized under a control mode for braking the tape-reel. In this embodiment, a solenoid smaller than that of the prior art can be used for biasing the shift member 57', because the spring member 104 assists the magnetic force applied to the solenoid against the spring member 106.

What is claimed is:

1. In combination, a device for selecting a tape-reel control mode adapted for use in a video tape recorder and/or player having a tape deck and having a pair of tape-reel setting discs to which a pair of tape reels journalled in a tape-cassette, support a tape portion stretched therebetween, are removably engaged as the tape-cassette is set on the deck, a torque transmission device for selectively supplying torque power from a drive motor to either one of the tape-reel setting discs, and means for braking said tape-reel setting discs under a selected predetermined control mode together with means for preventing slack in said stretched portion of a tape between said tape-reels, said braking means including braking members, characterized by a shift member retractably supported to a chassis and adapted to regulate said braking members, means for biasing said shift member at a braking position as the control mode is changed from a fast-running mode to another mode, a mode selecting cam associated to said shift member through a cam follow member, a cam-drive motor, a locking member adapted to lock said cam follow member at said fast-running mode position against biasing means, means for relieving the lock condition of said locking member relative to said cam follow member in such a manner that said mode selecting cam is controllably driven by said cam-drive motor in the same direction as that in the previous fast-running mode, just after the control mode is changed from the previous mode to the next mode; and means for locking said shift member in a fast-running mode position, and means for relieving the shift member from the locking condition, whereby said mode selecting cam being regulated by said cam drive motor just when the control mode is changed from the previous mode, thereby actuating said braking members ahead of the time at which said cam-drive motor starts under the next mode without it being loaded by said mode-selecting cam, and whereby said means for relieving includes an abutting member disposed on said locking member and a guide piece mounted on the mode-selecting cam so that the locking member turned with its abutting member being deflected by the guide piece in a manner to be disengaged from a free-end of said cam follow member when said mode-selecting cam is further turned in a counter-clockwise direction in which the tape-reel setting disc is driven under said fast-running mode.

2. The combination according to claim 1, wherein said means for relieving further including means for fast-relieving said cam follow member from said locking condition when said mode-selecting cam is not yet regulated by said cam drive motor just when the control mode is changed from the previous mode.

3. The combination according to claim 2; wherein said fast-relieving means comprises a kick lever fixedly connected to said locking member via a journal post, a kick arm pivoted to the kick lever and having a loop spring portion integrally formed thereto so as to bias the kick arm toward a stopper portion formed on said kick lever, and a plurality of abutting ribs mounted on one side face of a driven pulley and arranged along a circle coaxially defined relative to the pulley axis equidistantly spaced from each other, the kick arm being capable of being inserted against the bias of the loop spring portion into an area in which the abutting ribs are driven by the rotation of said pulley.

* * * * *